United States Patent [19]

Posseme

[11] Patent Number: 4,653,033

[45] Date of Patent: Mar. 24, 1987

[54] GONIOTELEMETRY SYSTEM

[75] Inventor: Gilles Posseme, Brest, France

[73] Assignee: Thomson-CSF, Paris, France

[21] Appl. No.: 657,793

[22] Filed: Oct. 4, 1984

[30] Foreign Application Priority Data

Oct. 14, 1983 [FR] France ............................ 83 16385

[51] Int. Cl.[4] ............................................. G01S 3/00
[52] U.S. Cl. ..................................... 367/125; 367/124;
367/118; 324/248
[58] Field of Search .................... 367/88, 99, 118, 125,
367/124; 324/248

[56] References Cited

U.S. PATENT DOCUMENTS

| | | | |
|---|---|---|---|
| 3,461,421 | 8/1969 | Stover | 367/124 |
| 3,559,161 | 1/1971 | Raudsep | 367/117 |
| 3,789,351 | 1/1974 | Feldman et al. | 340/850 |
| 4,349,781 | 9/1982 | Vozoff | 324/248 |
| 4,422,166 | 12/1983 | Klein | 367/115 |

Primary Examiner—Thomas H. Tarcza
Assistant Examiner—Daniel T. Pihulic
Attorney, Agent, or Firm—Roland Plottel

[57] ABSTRACT

A goniotelemetry system comprises two acoustic goniometers directed along two perpendicular axes taking measurements of angles at the intersection O of the two axii, as well as a triaxial magnetometer and a magnetic field gradientmeter situated at this intersection O.

It allows to localize marine craft simultaneously from their radiated acoustic noise and from their disturbance on the ground magnetic field in order to fire underwater mines.

11 Claims, 7 Drawing Figures

GONIOTELEMETRY SYSTEM

BACKGROUND OF THE INVENTION

The present invention concerns a goniotelemetry system and especially a system comprising acoustic measurement devices and magnetic measurement devices to localize moving objects, using their radiated acoustic noise and the ground magnetic field that they disturb. Such a system is particularly applicable to the localization of boats. It is suitable for locating ships by submarine mines placed or anchored on the sea bed.

DESCRIPTION OF THE PRIOR ART

It is known to localize the position of a boat by using three acoustic goniometers placed at different positions. Each goniometer determines, from the acoustic noise emitted by the boat, a propagation direction of the waves emitted. The combination of the measurements taken by the three goniometers allows to obtain the position of the boat. However, it has been found that the results obtained are not very accurate, due to the distances to be taken into consideration and the problems of precisely positioning the goniometers.

Another solution consists in taking magnetic measurements of the magnetic field disturbed by the boat. In this case it is possible to provide a triaxial magnetometer measuring the three coordinates of the magnetic field extracted at the measuring point as well as several devices for measuring the magnetic field gradient. This solution also yields results that are not very accurate and are difficult to exploit.

SUMMARY OF THE INVENTION

The present invention offers a measuring system supplying accurate results that are easy to exploit. Furthermore, it presents the advantage, on the one hand, of being easy to realize and, on the other hand, of occupying only a small amount of space, thus enabling it to be lodged in any device, such as a mine placed at the bottom of the sea.

The invention thus concerns a goniotelemetry system allowing especially to localize a moving object, which comprises at least a first and a second acoustic goniometers, located in a common plane, at least one triaxial magnetometer, at least one magnetic field gradientmeter as well as a calculator connected to the goniometers, to the triaxial magnetometer and to the magnetic field gradientmeter, receiving measurement data from these devices and supplying, in exchange, a measurement result of the position of the moving object.

BRIEF DESCRIPTION OF THE DRAWINGS

The invention will be better understood and other objects, features and advantages will become apparent by reading the following description given with reference to the appended figures in which.

DESCRIPTION OF THE PREFERRED EMBODIMENT

Figure 1:
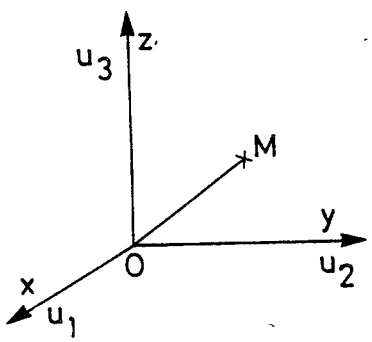
FIG. 1 is an explanatory diagram of a localization system.

A point M situated on an Oxyz trihedron as represented in FIG. 1 being considered, localizing this point M from a measurement point O means obtaining the vector radius $\vec{OM}$, and thus measuring of MO and three director cosines with respect to the reference trihedron connected to O.

In order to maintain an indexed notation, the following notations are adopted: $u_1=x$, $u_2=y$ and $u_3=z$, i.e. $u_i$ with $i=1,2$ and 3 referring respectively to the directions x, y and z.

In the case where the point M can only evolve in a half-space, for example, $u_3>0$, the knowledge of the two director cosines following $Ou_1$ and following $Ou_2$ is sufficient.

In known techniques, two families of localization systems are present: the acoustic localization system and the magnetic localization systems.

Figure 2:
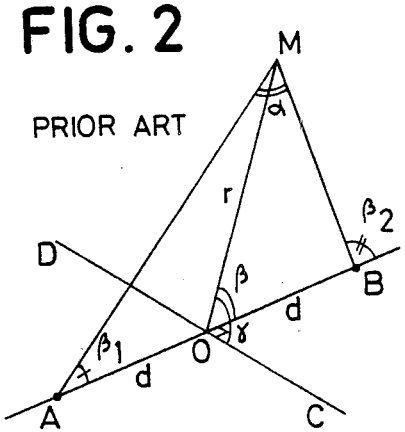
FIG. 2 is an explanatory diagram of an acoustic localisation system according to the prior art.

According to the acoustic localization systems, a point M can be localized with respect to three positions or points A, B and O, as represented in FIG. 2. If r is the distance from the point M to the point O and if $OA=OB=d$, r/d being great the angle $AMB=\alpha$ is small, the following may be written:

$$\beta \approx \frac{\beta_1 + \beta_2}{2} \text{ and } r = \frac{2d \sin \beta}{\sin \alpha}$$

Two goniometers in positions A and B supply directly the values of $\cos\beta_1$, and $\cos\beta_2$ and since:

$$\cos \beta_1 - \cos \beta_2 = \sin \beta \sin \alpha$$

from which $\sin \alpha$ then r are obtained.

A third goniometer in position O measures $\gamma$ to supply the direction.

The drawback of this system is that, if a range of 100 meters and a precision of two degrees on the angle measurement are presumed, a distance d greater than two meters is necessary. Furthermore, it is necessary that the measurements of $\beta_1$ and $\beta_2$ be realized from a single reference AB; this is very difficult, taking into account the mooring difficulties of such a system.

According to magnetic localization systems, the metallic mass of the moving object to be located disturbs the ambient magnetic field and the measurement of this disturbance theoretically allows this moving object to be located.

When it is supposed that the moving object is sufficiently removed from the measuring point, it is magnetically equivalent to a dipole of magnetic moment $\vec{M}$.

The values of these three coordinates of the magnetic field created by $\vec{M}$ at the measuring point distant from r are:

$$H_i = \frac{1}{4\pi} \sum_{j=1}^{3} \frac{M_j}{r^3} (3 a_i a_j - b_{ij}) \quad (1)$$

in which $a_i$ are the director cosines of $\vec{r}$ in the three directions $u_i$, and $b_{ij}=1$ for $i=j$ and $b_{ij}=0$ for $i \neq j$. For enhanced simplicity $H_i$ is identical to $H_{ui}$.

It is also known to measure the gradients of these magnetic coordinates.

In these conditions, the measurement of the coordinates of the magnetic field and the disturbed gradients of the magnetic field allow to localize a point M. By this method, however, although very difficult calculations must be carried out, only a very approximate result is obtained, due to the errors arising from the simplified model, of the director cosines and, therefore, of r.

The present invention thus supplies a precise localization system, which is easy to exploit and thus simple to operate.

Figure 3:
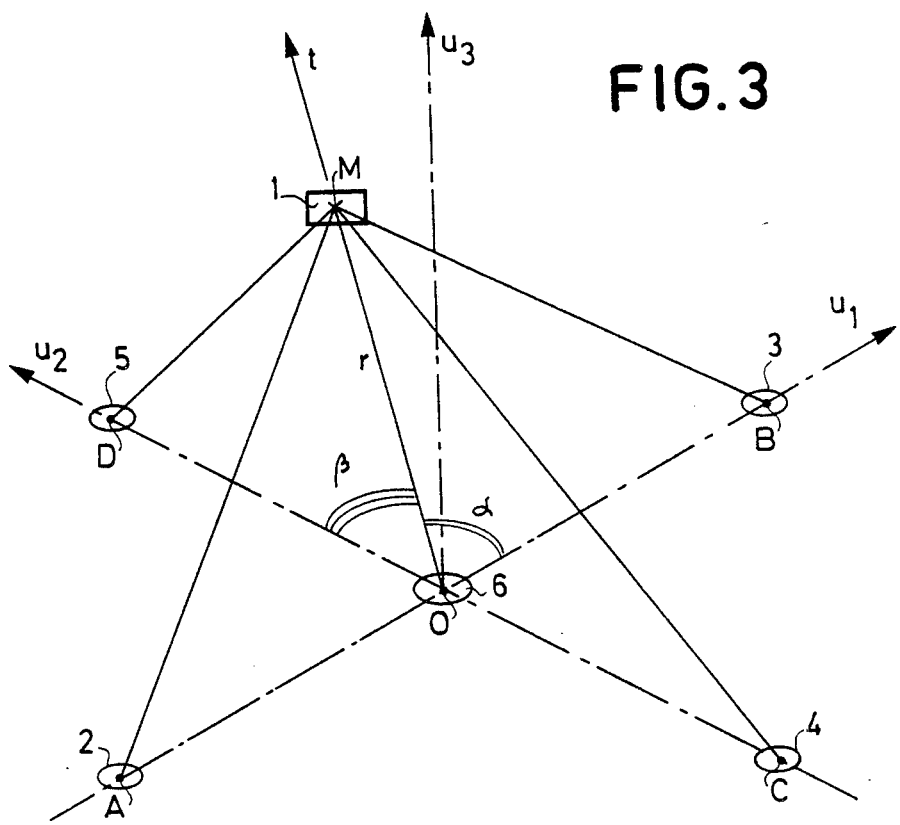
FIG. 3 is an explanatory diagram of the system according to the invention.

FIG. 3 represents an explanatory diagram of a system according to the invention. In a trirectangular trihedron $Ou_1u_2u_3$ is present an object 1, for example a boat, to be localized. On the axis $Ou_1$ are placed, at two points A and B, symmetrical with respect to point O, two acoustic sensors 2 and 3. On the axis $Ou_2$ are placed, at two points C and D symmetrical with respect to the point O, two acoustic sensors 4 and 5. At the point O is placed a triaxial magnetometer and a magnetic field gradientmeter 6. This gradientmeter measures the variation of a component $H_i$ of the field according to the axis $Ou_i$ of this component, i.e. $\delta H_i / \delta u_j$.

The two acoustic sensors 2 and 3 constitute a first goniometer and allow to measure, in the plane formed by the axis $O_1$ and the point M, the angle $\alpha = MOB$.

Furthermore, the two sensors 4 and 5 constitute a second goniometer and allow to measure, in the plane formed by the axis $Ou_2$ and the point M, the angle $\beta = MOD$.

If Ot designates the line passing through the points O and M, the two goniometers allow to determine the line Ot with respect to the plane formed by the two axes $Ou_1$ and $Ou_2$. It will be noted that three sensors may be sufficient to carry out such a measurement. The intersection O constitutes the mesurement point at which the angles $\alpha$ and $\beta$ are determined.

At the point O, the triaxial magnetometer and the gradientmeter of magnetic field 6 allow to measure the coordinates of the magnetic field and the coordinates of the magnetic field gradient. The distance r separating the point M from the point O is proportional to the three coordinates of the magnetic field and inversely proportional to the magnetic field gradient such as defined herein-above. The formula giving r is thus the following:

$$r = \frac{3}{\frac{\delta H_i}{\delta u_i}} \sum_{j=1}^{3} \sum_{k=1}^{3} B_j^k C_j^i H_k \quad (2)$$

in which i may take any of values 1, 2 and 3.
with $$B_j^k = \frac{3}{2} a_j a_k - b_{jk}$$

with ($b_{jk} = b_{ij} = 1$ for j=k or i=j)

($b_{jk} = b_{ij} = 0$ for j≠k or i≠j)

and $C_j^i = -5a_i^2 a_j + 2a_i b_{ij} + a_j$

In the same formulae, a are the director cosines so that:

$a_1 = \cos \alpha \quad a_2 = \cos \beta \quad a_3^2 = 1 - (a_1^2 + a_2^2)$

Furthermore, the knowledge of r allows to determine the coordinates $M_1$, $M_2$, $M_3$ of the following dipolar moment $$M_j = 4 \pi r^3 \sum_{k=1}^{3} B_j^k H_k \quad (3)$$

obtained by inversing the relation (1).

Figure 4:
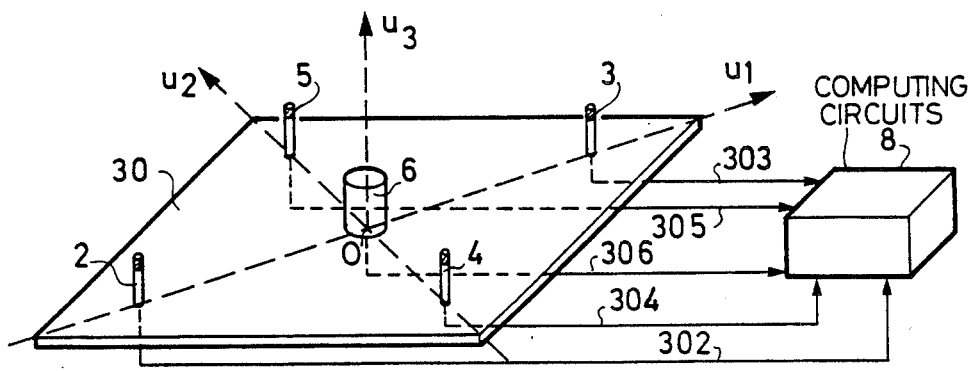
FIG. 4 shows an embodiment of the system according to the invention.

FIG. 4 represents an embodiment of the system shown in FIG. 3.

In this embodiment, the sensors are of the low electric noise omnidirectional type. Each sensor 2 to 5 and the gradientmeter of magnetic field 6 are connected to a processing device 8 through connections 302 to 306. This device 8 comprises means for calculating, on the one hand, the cosines of angles $\alpha$ and $\beta$ from the data supplied by the goniometers, and on the other hand, the distance r, by using the formulae given herein-above, from data supplied by the magnetic field gradientmeter and the director cosines.

In order to obtain a correct measurement of r, the plan support (30) must be parallel to the surface of the sea, i.e. horizontal. If the support moves, which is the case when it is not placed on the sea bed, the support (30) and the sensors can be mounted in such a way as to obtain a self-righting or its position in space can be determined through the use of two position sensors, for example, accelerometers, one according to $u_1$, the other according to $u_2$, the calculation of r being connected by a simple change of axes.

It is to be noted that the support 30 could be made of material absorbing the acoustic waves in such a way as to prevent parasitory reflection phenomena that are prejudicial to taking accurate measurements.

The magnetic field gradientmeter 6 can be constituted from two distinct devices. According to the embodiment represented in FIG. 5, it is formed of a single device according to a fluxgate type.

Figure 5:
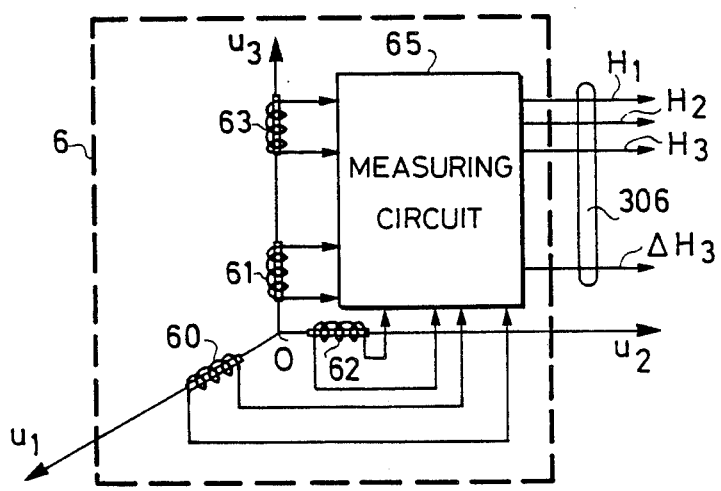
FIG. 5 represents an embodiment of the circuits used in the system according to the invention.

As schematically represented in FIG. 5, the portion sensitive to the magnetometer is composed of three probes (60), (61) and (62) according to three axes ($Ou_1$, $Ou_2$, $Ou_3$), each probes being formed by a saturable magnetic core and an excitation winding throughcrossed by an alternate current.

A measuring circuit (65) detects the presence of a magnetic field according to the axis of the probe A probe (63) placed accordingly to the same axis $Ou_3$ as the probe (61) allows to obtain in cooperation with it the measurement of the field gradient according to the axis $Ou_3$ ($\Delta H_3$). The values $H_1$, $H_2$, $H_3$ and $\Delta H_3$ are supplied on the output connection 306.

Figure 6:
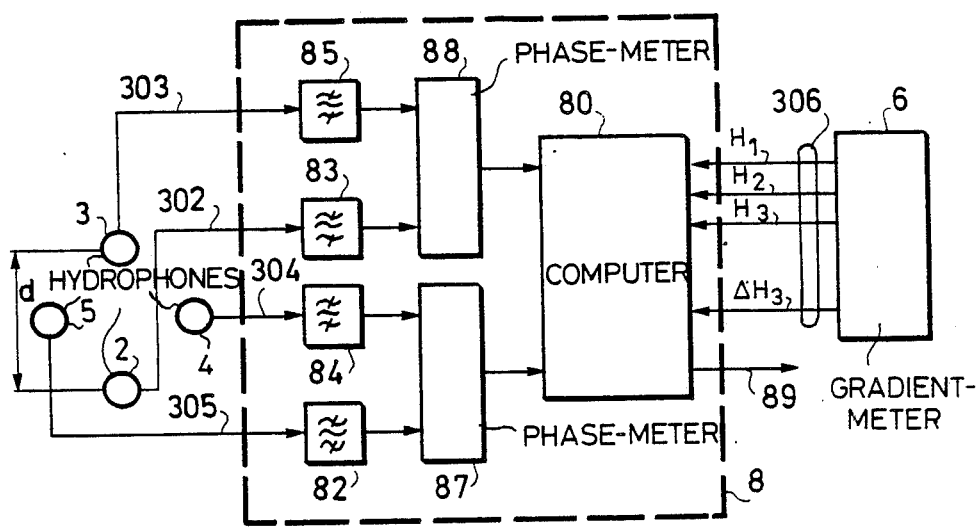

With reference to FIG. 6, a realization of the processing device 8 of FIG. 4 will now be described.

This figure shows sensors 2 to 5 disposed in a manner analogous to the previous dispositions, the gradientmeter 6, situated to the right of the figure for enhanced clarity of the representation, and the processing device 8. The processing device 8 comprises filters 82, 83, 84, 85 connected respectively to connections 302, 303, 304, 305, a first phasemeter 87 connected to the filters 82 and 84 corresponding to two acoustic sensors 4 and 5 of a single goniometer, a second phasemeter 88 connected to the filters 82 and 83 corresponding to the two other acoustic sensors 2 and 3 of the goniometer. The device 8 also comprises a calculator 80 receiving the digital datas of the phasemeters and of the gradientmeter 6, processing them and supplying, on an output 89, data as to the position of the boat according to (2) and the coordinates of the dipolar moment according to (3).

The sensors 2 to 5 receive acoustic waves issuing from the boat 1 (of FIG. 3). The band of the acoustic noise extends in a relatively wide range, of several Hertz to several thousand Hertz. The signals supplied by the sensors 2 to 5 on their connection 302 to 305 are thus filtered in a narrow band about an operating frequency selected for the system. By way of example, it is possible to operate at a frequency of 2 500 Hertz. The resulting signals are transmitted to the two inputs of two phasemeters 87 and 88. These phasemeters, advantageously digital, supply the values of the two director cosines $a_1$ and $a_2$ according to $Ou_1$ and $Ou_2$. If $\alpha$ is the distance separating the two sensors 2 and 3 as well as 4 and 5, the director cosines is obtained by the measurement of the difference of phase $\Delta\phi$ according $$a = \frac{\lambda \Delta \phi}{2\pi d}$$

where $\lambda$ is the wavelength corresponding to the operating frequency. So that $\Delta$ is always smaller than 180°, the distance $\alpha$ is selected so that $d < \lambda/2$. At an operating frequency of 2 500 Hz, d will be taken, for example, equal to 30. The values of the director cosines are transmitted to the calculator 80. This receives, furthermore, by the connection 306, the values of the magnetic field and magnetic field gradient coordinates. The application of the formulae cited above thus allow the calculator 80 to supply on the output 89 of the direction, the distance and the coordinates of the dipolar moment.

The system can comprise three gradientmeters measuring the variations $\delta H_1/\delta u_1$, $\delta H_2/\delta u_2$, $\delta H_3/\delta u_3$ and the gradientmeter which supplies the strongest amplitude signal has been selected. Indeed, any one of these three gradients can be used.

Figure 7:
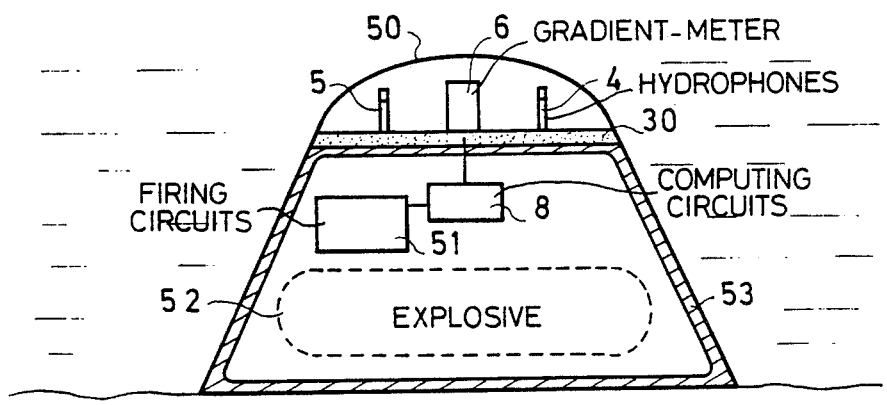
FIG. 7 represents an example of the installation of a system according to the invention on a submarine mine.

FIG. 7 represents an example of operating the system of the invention in an underwater mine.

An effective underwater mine must be able to localize as precisely as possible the boats that approach it in order to carry out an eventual operational classification and to decide the instant of firing. For example, if it relates to a deep mine, the calculation of the distances projected on the vertical axis allows to distinguish between surface boats and submarines.

FIG. 7 schematically represents a mine placed on the sea bed and supplied with a goniotelemetry system described herein-above.

The system is mounted on the upper portion of the mine. The hull is truncated and advantageously a moulding in acoustically transparent plastic material (50) protects the sensors such as 4 and 5, as well as the magnetic field gradientmeter 6 fixed on the support 30. The explosive charge 52 and the associated electronics that control in particular the firing from the indications supplied by the processing device 8 of the system according to the invention are represented on said figure.

I claim:

1. Goniotelemetry system for localizing marine craft, comprising at least first and second acoustic goniometers situated in a single horizontal plane and crossing each other, at least one triaxial magnetometer, at least one magnetic field gradientmeter and a calculator connected to the goniometers, to the triaxial magnetometer and to the magnetic field gradientmeter to receive the measurements of these devices and to determine the position of the craft.

2. Goniotelemetry system according to claim 1, in which the calculator allows to determine, furthermore, the value of the coordinates of the bipolar moment of the craft.

3. Goniotelemetry system according to claim 1, in which the first acoustic goniometer comprises two sensors disposed along a first axis and the second acoustic goniometer comprises two sensors disposed along a second axis cutting the first axis at an intersection point situated mid-way between the four sensors so that the measurement of each goniometer is aligned at the intersection point.

4. Goniotelemetry system according to claim 3, in which the triaxial magnetometer as well as the magnetic field gradientmeter are situated at the intersection point.

5. Goniotelemetry system according to claim 4, in which the triaxial magnetometer is directed so as to measure the coordinates of the magnetic field along the first and second axes, and along a third axis perpendicular to the first two.

6. Goniotelemetry system according to claim 5, in which the magnetic field gradientmeter is directed so as to measure the magnetic field gradient along a third direction.

7. Goniotelemetry system according to claim 4, in which the first axis and the second axis are perpendicular.

8. Goniotelemetry system according to claim 6, in which the goniometers, the triaxial magnetometer and the gradientmeter are fixed on a bed made of acoustic waves absorbing material.

9. The system of claim 1 further comprising an explosive charge and means for firing said explosive charge in response to said calculated measurements.

10. A method for locating marine craft which comprises: providing at least two acoustic goniometers situated in a single horizontal plane and crossing each other at an intersection point, providing at least one triaxial magnetometer and at least one magnetic field gradientmeter each situated at said intersection point; providing means for calculating the position of said craft by use of said measurements; and receiving marine craft locating measurements from each of said goniometers, magnetometer and gradientmeter and calculating the position of said craft by means of said measurements.

11. The method of claim 10 in which each acoustic goniometer comprises two sensors disposed along axes which intersect at said intersection point mid-way between the four sensors.

* * * * *